July 11, 1933.   R. F. BACON ET AL   1,917,232
RECOVERY OF SULPHUR
Filed Feb. 26, 1930
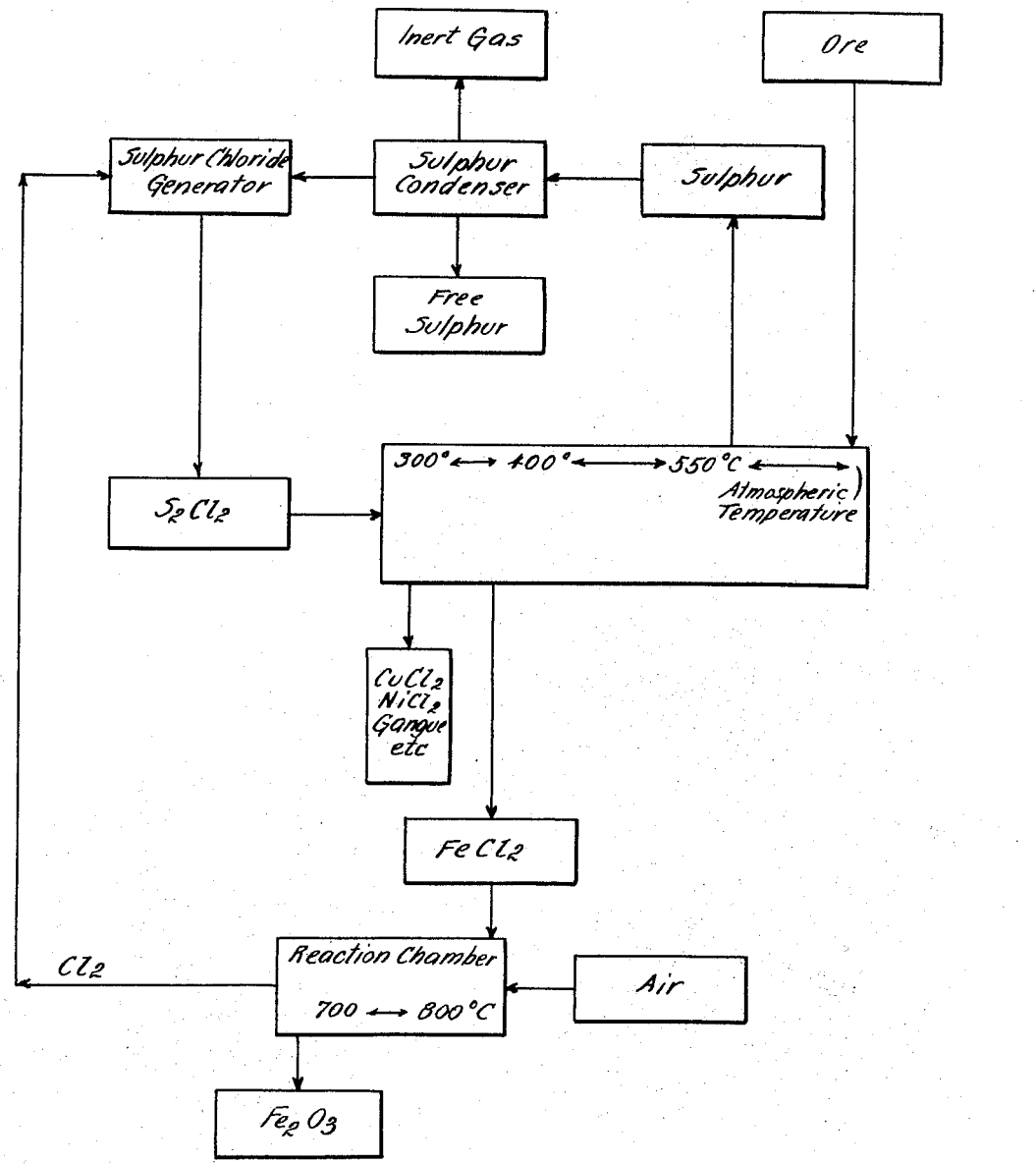
INVENTORS
RAYMOND F. BACON
HENRY T. HOTCHKISS Jr.
BY
Pennie, Davis, Marvin & Edmonds
ATTORNEYS Patented July 11, 1933

1,917,232

UNITED STATES PATENT OFFICE

RAYMOND F. BACON, OF BRONXVILLE, AND HENRY T. HOTCHKISS, JR., OF NEW ROCHELLE, NEW YORK; SAID HOTCHKISS, JR., ASSIGNOR TO SAID BACON

RECOVERY OF SULPHUR

Application filed February 26, 1930. Serial No. 431,467.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals, such for example, as copper and nickel, with sulphur chloride for the purpose of obtaining free sulphur and/or separating iron from the mass of material undergoing treatment.

In carrying out a process in accordance with the present invention, a quantity of the material to be treated is subjected to the action of sulphur chloride under such conditions that free sulphur and ferric chloride are produced and vaporized. The vaporized sulphur is collected and the ferric chloride is utilized for treating additional quantities of sulphide-bearing material to produce a product in which ferrous chloride is concentrated. The ferrous chloride concentrate is appropriately treated to recover chlorine which is returned to the process.

The process may be conveniently conducted by passing the sulphide-bearing material progressively through reaction zones of different temperatures. According to the preferred process of the invention, the iron sulphide-bearing material is first introduced into a reaction zone of relatively high temperature and passed progressively through reaction zones of lower temperatures. The process is so controlled that ferrous chloride is produced in the high temperature reaction zones and ferric chloride is produced in the lower temperature reaction zones. Elemental sulphur is produced and vaporized and the ferric chloride produced is vaporized. The vaporized sulphur and ferric chloride are caused to pass over fresh or partially converted sulphide-bearing material in the higher temperature reaction zones, the sulphur vapor ultimately being collected as free sulphur, and the ferric chloride reacting with sulphide compounds and being reduced to ferrous chloride.

The process may be carried out in any suitable type of apparatus, but it is preferably carried out in a rotary reaction chamber in which a suitable temperature gradient is maintained and into which the sulphur chloride and iron sulphide-bearing material are introduced at appropriate points.

The invention will be better understood from a consideration of the accompanying flowsheet and the following description of a process involving the treatment of ore containing pyrites and sulphides of copper and nickel.

The ore to be treated is introduced in a dry, finely divided condition into the interior of a rotary reaction chamber having charging means at one end and discharging means at the other end. An opening or passage to permit the outward passage of sulphur vapors and other gases is provided near the charging end. The temperature within the reaction chamber is so regulated that it gradually increases from the normal atmospheric temperature at the charging end to a maximum temperature of about 550° C. at a point about midway between the two ends, and gradually decreases from the region of maximum temperature to about 300° C. at the discharge end. The opening or passage for sulphur vapors is preferably located at a point between the charging end of the chamber and the region of maximum temperature where the temperature within the chamber is about 450° C. or slightly lower.

The ore, preferably ground to provide particles sufficiently small to pass a 100-mesh screen in order that intimate contact of the sulphur chloride with the sulphide compounds may be obtained, is introduced into the reaction chamber at the charging end. Sulphur chloride is introduced into the reaction chamber at the discharge end. The sulphur chloride may be introduced into the reaction chamber as a liquid or as a gas. Liquid sulphur chloride will be vaporized immediately after its introduction.

The process is conducted as a batch process, the discharge end of the chamber being closed. The ore may be fed to the chamber continuously until the desired concentration has been effected, or the ore may be fed to the reaction chamber until a predetermined amount has been introduced.

When ore is first introduced into the reaction chamber, no sulphur chloride is introduced until the ore reaches or passes the zone of maximum temperature. As the ore reaches the zone of maximum temperature, the sulphur chloride may be admitted, slowly at first, and in gradually increasing amounts as the ore and chlorinated material progress through the chamber. Sulphur chloride may be admitted at any desired maximum rate. The rate at which sulphur chloride is admitted and the amount of sulphur chloride admitted will be determined by the rate of feeding of ore into the reaction zones and the amount of ore to be treated.

During the course of the process, the sulphur chloride first reacts with the sulphides of iron, copper and nickel to produce free sulphur, ferrous chloride and the chlorides of copper and nickel. The free sulphur is vaporized and passes out of the reaction chamber to suitable collecting and condensing apparatus. As the reaction chamber is rotated, the ferrous chloride-bearing material moves gradually toward the discharge end and fresh ore is moved into the zone of maximum temperature. As the ferrous chloride-bearing material moves toward the discharge end the sulphur chloride reacts with the ferrous chloride and oxidizes it to ferric chloride. The ferric chloride produced is vaporized and the resulting vapor is swept along with the sulphur chloride toward the zone of maximum temperature. The ferric chloride comes into contact with fresh or partially chlorinated sulphide-bearing material and is reduced to ferrous chloride.

The process is so conducted and controlled that iron compounds are substantially completely eliminated from the material in the discharge end portion of the reaction chamber and ferrous chloride is concentrated in the adjoining portion of the reaction chamber. The material in the discharge end portion of the reaction chamber will consist substantially entirely of nickel and copper chlorides and gangue materials which may be present in the original ore.

When the ore is fed continuously during the course of a process, the admission of ore and sulphur chloride may be discontinued when the presence of considerable ferric chloride in the issuing sulphur vapor indicates that insufficient fresh ore is being moved into the reaction zones to react with the ferric chloride produced, or when the operations have been conducted for a predetermined length of time.

When the ore is fed to the reaction chamber only until a predetermined amount has been admitted, the admission of sulphur chloride may be discontinued when the last portion of the ore reaches the zone of maximum temperature. The process may be so conducted that satisfactory concentration will have been effected at that time.

In the case of continuous feeding, at the completion of the chlorination treatment, the iron-free material containing chlorides of copper and nickel will be segregated in the discharge end portion of the chamber, fresh or substantially unaltered ore will be present in the portion of the reaction chamber between the charging end and the zone of maximum temperature, and the ferrous chloride-bearing material will be concentrated in the intermediate portion of the reaction chamber.

Upon the completion of a chlorination process involving the admission of a predetermined amount of ore, the iron-free material will be segregated in the discharge end portion of the reaction chamber, and the ferrous chloride-bearing material will be concentrated in the adjoining portion of the chamber. The charging end portion of the chamber will be empty.

When the admission of sulphur chloride has been discontinued, the discharge end of the reaction chamber may be opened. Rotation of the reaction chamber will cause the contents to be discharged. The iron-free material containing chlorides of copper and nickel is discharged and collected first. While the iron-free material is being discharged the ferrous chloride concentrate is being moved toward the discharge end. After the iron-free material has been discharged and collected, the ferrous chloride concentrate is discharged and collected separately.

When the ferrous chloride concentrate has been discharged, treatment of a fresh batch of ore is commenced.

The ferrous chloride concentrate is subjected to the action of air at a temperature of 700° C. to 800° C. to recover chlorine. The treatment of the ferrous chloride concentrate is preferably so conducted that free chlorine is produced.

The chlorine recovered is passed through a bath of molten sulphur which has been obtained by condensing a portion of the sulphur vapor recovered during the treatment of the sulphide-bearing material with sulphur chloride. The sulphur bath is maintained at a temperature above the boiling point of sulphur chloride and the sulphur chloride distills off as formed. The reaction between sulphur and chlorine will proceed at a temperature below the boiling point of sulphur chloride, but it is advantageous to conduct the reaction at a temperature above the boiling point of sulphur chloride in order to effect the immediate removal of the sulphur chloride from the reaction zone. The sulphur chloride vapor may be condensed to permit the escape of inert gases which enter the system during the admission of air. If desired, the inert gases may be conducted through a tower of solid sulphur in order to scrub out any sulphur chloride vapors contained therein. The sulphur chloride produced is utilized for treating the fresh batch of ore.

Inert gases, such as nitrogen, which are introduced into the system during the treatment of the ferrous chloride concentrate with air may also be eliminated when the free sulphur produced is condensed.

A source of fresh chlorine is provided to compensate for losses due to leakage and the formation of nickel and copper chlorides.

The iron-free material may be treated in any suitable manner to recover the nickel and copper.

We claim:

1. The method of treating iron sulphide-bearing material which comprises, bringing sulphur chloride in contact with said material at temperatures which progressively increase as less chlorinated portions of the material come in contact with chlorinating agent, said temperatures increasing from a point above the boiling temperature of ferric chloride to a point further above the boiling temperature of ferric chloride but below the boiling temperature of non-ferrous metal chlorides in the material.

2. The method of treating iron sulphide-bearing material which comprises, bringing sulphur chloride in contact with said material at temperatures which progressively increase from approximately 300° C. to 550° C. as less chlorinated portions of the material come in contact with chlorinating agent.

3. The method of treating iron sulphide-bearing material which comprises, contacting sulphur chloride with one portion of said material to convert the iron sulphide to ferric chloride, volatilizing said ferric chloride whereby a substantially iron-free product is obtained, and contacting said ferric chloride with another portion of said material to chlorinate the same.

4. The method of treating iron sulphide-bearing material which comprises, chlorinating one portion of said material to convert the iron sulphide to ferrous chloride, contacting the ferrous chloride so obtained with sulphur chloride to form ferric chloride, volatilizing said ferric chloride whereby a product is obtained containing the non-ferrous metal compounds substantially free of iron, and contacting said ferric chloride with another portion of said material to chlorinate the same.

5. The method of treating iron sulphide-bearing material which comprises, passing said material through a reaction chamber in one direction, passing sulphur chloride through said chamber in the opposite direction, maintaining such temperature in the region of primary contact of said sulphur chloride with said material that the iron in the material is converted to ferric chloride and volatilized, passing the mixture of sulphur chloride and ferric chloride in countercurrent flow with said material at a progressively increasing temperature whereby said material is chlorinated by said sulphur chloride and ferric chloride, and restricting the maximum temperature to a point below that at which chlorides of the non-ferrous metal constituents of said material will volatilize.

6. The method of treating iron sulphide-bearing material which comprises, passing said material through a reaction chamber in one direction, passing sulphur chloride through said chamber in the opposite direction, maintaining a temperature of not less than approximately 300° C. in the region of primary contact of said sulphur chloride with said material, whereby the iron in the material is converted to ferric chloride and volatilized, passing the mixture of sulphur chloride and ferric chloride in countercurrent flow with said material at a progressively increasing temperature whereby said material is chlorinated by the action of said sulphur chloride and ferric chloride, and limiting the maximum temperature to not more than approximately 550° C.

In testimony whereof we affix our signatures.

RAYMOND F. BACON.
HENRY T. HOTCHKISS, Jr.